US006252973B1

(12) United States Patent
January et al.

(10) Patent No.: US 6,252,973 B1
(45) Date of Patent: Jun. 26, 2001

(54) APPARATUS AND METHOD FOR DETERMINING VEHICLE WHEEL ALIGNMENT MEASUREMENTS FROM THREE DIMENSIONAL WHEEL POSITIONS AND ORIENTATIONS

(75) Inventors: Daniel B. January, St. Peters, MO (US); Leigh R. Burns, Jr., Troy, IL (US); Nicholas J. Colarelli, III, Creve Coeur, MO (US)

(73) Assignee: Hunter Engineering Co., Bridgeton, MO (US)

( * ) Notice: Subject to any disclaimer, the term of this patent is extended or adjusted under 35 U.S.C. 154(b) by 0 days.

(21) Appl. No.: 09/416,643

(22) Filed: Oct. 12, 1999

Related U.S. Application Data

(63) Continuation of application No. 08/781,284, filed on Jan. 10, 1997, now Pat. No. 6,064,750.

(51) Int. Cl.⁷ ........................................................ G06K 9/00
(52) U.S. Cl. .................. 382/100; 33/203.18; 356/139.09
(58) Field of Search ................................... 382/100, 103; 33/288, 203.18; 356/155, 139.09

(56) References Cited

U.S. PATENT DOCUMENTS

| | | | | |
|---|---|---|---|---|
| 4,880,309 | * | 11/1989 | Wanta | 356/401 |
| 5,535,522 | * | 7/1996 | Jackson | 33/288 |
| 5,675,515 | * | 10/1997 | January | 364/559 |
| 5,724,128 | * | 3/1998 | January | 356/139.09 |
| 5,724,743 | * | 3/1998 | Jackson | 33/288 |
| 5,948,024 | * | 9/1999 | O'Mahony et al. | 33/288 |
| 6,018,878 | * | 2/2000 | Fukuda et al. | 33/203.18 |
| 6,064,750 | * | 5/2000 | January et al. | 382/103 |

OTHER PUBLICATIONS

Tsai et al, A Versatile Camera Calibration Technique for High–Accuracy 3D Machine Vision Metrology Using Off–The–Shelf TV Cameras and Lenses, Aug. 1987, vol. RA–3, No. 4, pp. 323–344 in IEEE Journal of Robotics and Automation.*

Haralick et al, vol. 11 of Computer and Robot Vision, pp. 61–93, Aug. 1987.*

* cited by examiner

Primary Examiner—Bhavesh Mehta
(74) Attorney, Agent, or Firm—Thompson Coburn LLP

(57) ABSTRACT

Apparatus and method for determining the alignment of a wheel of a vehicle includes mounting a known optical target to a wheel on the vehicle, the known optical target having a plurality of optical elements, each optical element having at least one straight edge disposed on a background, obtaining at least one video image of the optical target, estimating from the video image of the optical target the characteristics in said video image of a plurality of lines corresponding to projections onto the video image of the straight edges of the optical elements, and determining from the estimates of the characteristics the alignment of the wheel. A similar target for determining the position of a runway on which the vehicle is positioned is also disclosed.

8 Claims, 7 Drawing Sheets

APPARATUS AND METHOD FOR DETERMINING VEHICLE WHEEL ALIGNMENT MEASUREMENTS FROM THREE DIMENSIONAL WHEEL POSITIONS AND ORIENTATIONS

CROSS REFERENCE TO RELATED APPLICATIONS

This application is a continuation of prior application, Ser No. 08/781,284, filed Jan. 10, 1997, now U.S. Pat. No. 6,064,750.

STATEMENT REGARDING FEDERALLY SPONSORED RESEARCH OR DEVELOPMENT

Not Applicable

BACKGROUND OF THE INVENTION

The present invention relates to vehicle wheel alignment, and more particularly to vehicle wheel alignment systems which measure the locations and orientations of the vehicle wheels in a three dimensional coordinate system.

European Patent Application PCT/US93/08333, filed in the name of Jackson and published under the Patent Cooperation Treaty as WO 94/05969 (hereinafter referred to as 94/05969) has issued in the U.S. as U.S. Pat. No. 5,535,522. U.S. patent application Ser. No. 08/651,766, filed May 22, 1996, now U.S. Pat. No. 5,675,515 discloses in detail certain improvements to the invention described in the 94/05969 application. The full disclosures of all three of these documents are incorporated herein by reference.

U.S. Pat. No. 5,535,522 discloses that measurements are made of the images formed in video cameras of optical targets which are mounted to a wheel of a vehicle. As shown in FIG. 3 of that patent and described therein, the target is a flat plate on which appears an array of circles. See, for example, column 9, lines 27–37:

"An example of a typical target 54 that can be used on the wheels of the vehicle 20 is illustrated in FIG. 3. As can be seen from this figure, the target consists of a flat plate with a pattern of two differently sized circles 62, 63 marked in a pre-determined format thereon. Although a specific pattern is shown in this figure, it will be evident that a large number of different patterns can be used on the target 54. For example, the target need not be circular, a larger or smaller number of dots may by included. Moreover, other sizes and shapes can be used for the dots. In addition, multifaceted plates or objects can also be used for the targets."

Other than the last sentence cited above, U.S. Pat. No. 5,535,522 does not disclose or discuss any other shape for the elements of the targets (i.e. the "dots") than circles, nor does it disclose or discuss any advantages or disadvantages of using any shape of target elements other than circles.

To determine the position and orientation of the target, measurements must be made of the visual image of the elements of the target. See, for example, column 9, lines 50–60 of the '522 patent:

"The apparatus could, for example, calculate the center of each of the circles 62a, 62b by means of, say, a method called centroiding. This is a method commonly used by image analysis computers to determine the positioning of the center point or center line of an object. Once the center points of the two circles 62a, 62b have been determined, the distance between the two can be measured. This process is then repeated for other circles in the pattern on the target 54. These distances can then be compared to the true distances (i.e. non-perspective distances) between the respective centers. Similarly, the angle to the horizontal (or vertical) of the line joining the two centers can be determined. Once allowance has been made for the effect of the focal length of the lens 40 and other optical characteristics of the components such as beam splitter 42, mirror 44 and mirrors 46L, 46R are considered, a calculation can be made as to what the orientation of the target 54 is."

As described in U.S. Pat. No. 5,535,522 and as is well known in the art, the circles of the target project onto the detected image as ellipses. Measuring parameters in a video image of an ellipse, such as location of centroid, lengths of major and minor axes, and orientation of major and minor axes, cannot be performed with resolution and accuracy sufficient to provide acceptable wheel alignment measurements.

What is needed is video alignment system including target elements which allow much higher precision in the measurement of the detected image, thereby providing much higher resolution and accuracy in the resulting wheel alignment measurements. Further, what is needed is a scheme for determining the quality of the measurements of the detected image, such that the measurements can be refined and improved resolution and accuracy results. Still further, what is needed is an improved ability to determine, in a video image, which detected objects constitute images of the elements of the optical target. It would also be desirable to have an improved scheme for using optical targets to locate the surface on which the vehicle wheels roll.

BRIEF SUMMARY OF THE INVENTION

Among the various objects and features of the present invention may be noted the provision of an improved wheel alignment system which determines the camber, caster, toe, and other alignment parameters of the vehicle wheels, with high resolution and accuracy.

A second object is the provision of an improved optical target for use with a wheel alignment system which allows for measurement of wheel alignment with high resolution and accuracy.

A third object is the provision of an improved optical target for use with a wheel alignment system which allows for determination of the quality of measurement of parameters.

A fourth object is the provision of such a system which provides for easy and fast recognition of the elements of a target in a visual image which includes other elements that are not part of the target.

Other objects and features will be in part apparent and in part pointed out hereinafter.

Briefly, in a first aspect of the present invention, a method of determining the alignment of a wheel of a vehicle includes the steps of mounting a known optical target to the wheel on the vehicle, the known optical target having a plurality of optical elements, and the optical elements each having at least one straight edge disposed against a background. The method further includes the steps of obtaining at least one video image of the optical target, estimating from the video image of the optical target the characteristics in the video image of a plurality of lines corresponding to projections onto the video image of the straight edges of the optical elements; and determining from the estimates of the characteristics the alignment of the wheel.

In a second aspect, the method includes the steps of mounting a known optical target to the wheel on the vehicle, the known optical target having a plurality of optical elements which are substantially surrounded by a substantially hollow optical element, obtaining at least one video image of said optical target, identifying in the video image the projections of the plurality of the optical elements by first identifying the projection of the hollow optical element, determining characteristics of the projections of the optical elements in the video image, and determining from the characteristics the alignment of the wheel.

In a third aspect, the method includes the steps of mounting a known optical target to a wheel chock, said wheel chock being placed adjacent a wheel of the vehicle so as to prevent the vehicle from rolling along the surface, the known optical target having a plurality of optical elements, obtaining at least one video image of the optical target, determining characteristics of projections of the optical elements in the video image, determining from the characteristics the position and orientation of the optical target, and determining from the position and orientation of the optical target the position of a point on the surface.

In a fourth aspect of the present invention, the method includes the steps of mounting a known optical target to the wheel on the vehicle, the known optical target having at least one optical element, the at least one optical element having a plurality of straight edges disposed against a background, obtaining at least one video image of the optical target, estimating from the video image of the optical target the characteristics in the video image of a plurality of lines corresponding to projections onto the video image of the straight edges, and determining from the estimates of the characteristics the alignment of the wheel.

In a fifth aspect of the present invention, an apparatus for determining the alignment of a wheel of a vehicle includes a known optical target mounted to the wheel on the vehicle, the known optical target having a plurality of optical elements, the optical elements each having at least one straight edge disposed against a background, at least one video camera for obtaining at least one video image of the optical target, and at least one processor for identifying from the video image of the optical target the characteristics in the video image of a plurality of lines corresponding to projections onto the video image of the straight edges of the optical elements and for determining from the estimates of the characteristics the alignment of the wheel.

In a sixth aspect of the present invention, the apparatus includes a known optical target mounted to the wheel on the vehicle, the known optical target having a plurality of optical elements which are substantially surrounded by a substantially hollow optical element, at least one video camera for obtaining at least one video image of the optical target, and at least one processor for identifying in the video image the projections of the plurality of the optical elements by first identifying the projection of the hollow optical element, for determining characteristics of the projections of the optical elements in the video image, and for determining from the characteristics the alignment of the wheel.

In a seventh aspect of the present invention, the apparatus includes a known optical target mounted to a wheel chock, the wheel chock being placed adjacent a wheel of the vehicle so as to prevent the vehicle from rolling along the surface, the known optical target having a plurality of optical elements, at least one video camera for obtaining at least one video image of the optical target, and at least one processor for determining characteristics of the projections of the optical elements in the video image, for determining from the characteristics the position and orientation of the optical target, and for determining from the position and orientation of the optical target the position of a point on the surface.

In an eighth aspect of the present invention, the apparatus includes a known optical target mounted to the wheel on the vehicle, the known optical target having at least one optical element, the at least one optical element having a plurality of straight edges disposed against a background, at least one video camera for obtaining at least one video image of the optical target, and at least one processor for estimating from the video image of the optical target the characteristics in the video image of a plurality of lines corresponding to projections onto the video image of the straight edges, and for determining from the estimates of the characteristics the alignment of the wheel.

BRIEF DESCRIPTION OF THE DRAWINGS

Similar reference characters indicate similar parts throughout the several views of the drawings.

DETAILED DESCRIPTION OF THE PREFERRED EMBODIMENT

It is preferred that the present invention be embodied in a computer controlled vehicle wheel alignment system, as is usual and customary in the art. Most modem wheel alignment systems are built using an off-the-shelf IBM compatible personal computer (PC) which is connected to the requisite alignment sensors through the built-in serial ports of the PC or through custom designed hardware.

Figure 14:
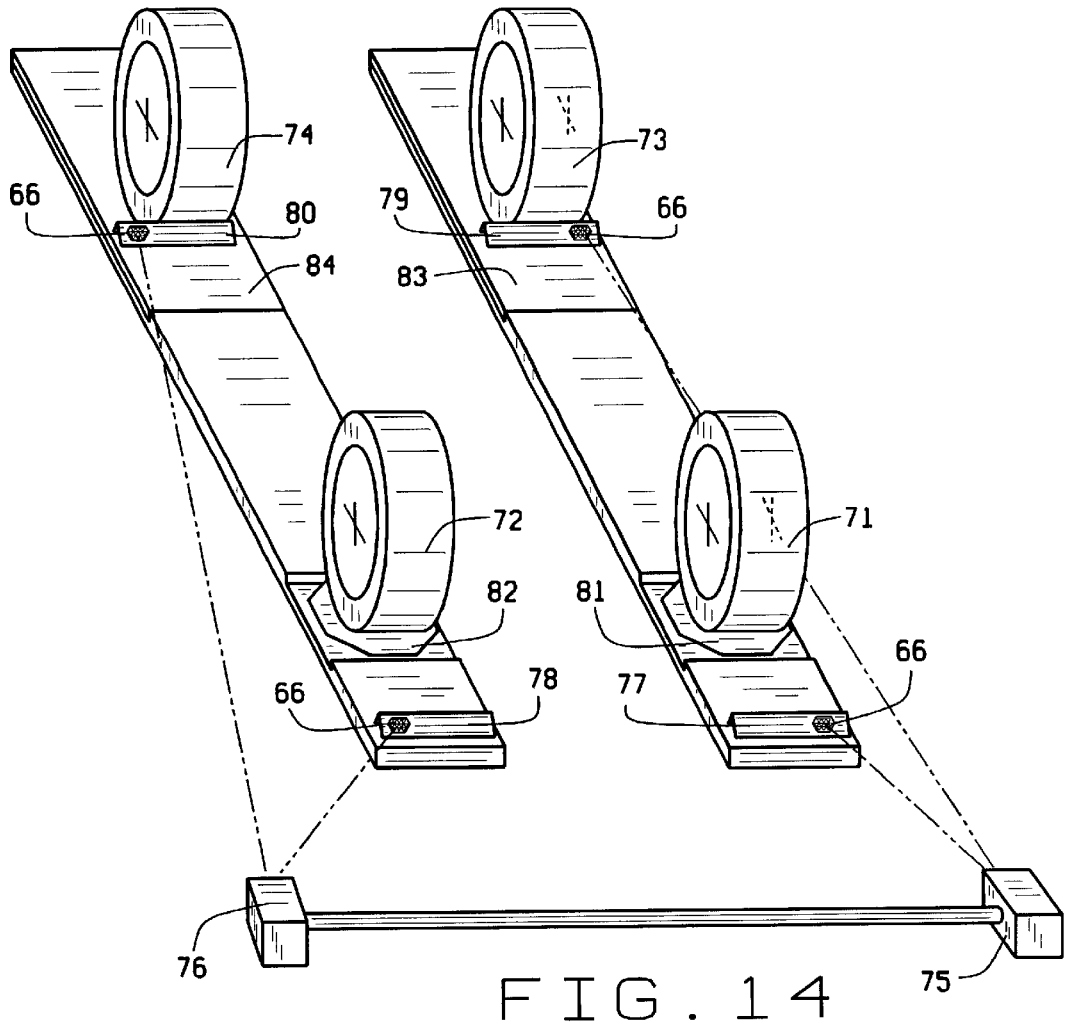
FIG. 14 is an isometric view, illustrating how video cameras are used to view the optical targets of FIG. 10 which are mounted to the wheel chocks.

As will be discussed in more detail presently, the sensors of the present invention consist of a pair of video cameras which are made to view optical targets mounted to the vehicle wheels. This is illustrated in FIG. 14 and is very similar to the disclosure in U.S. Pat. No. 5,535,522 and in U.S. patent application Ser No. 08/651,766.

Figure 1:
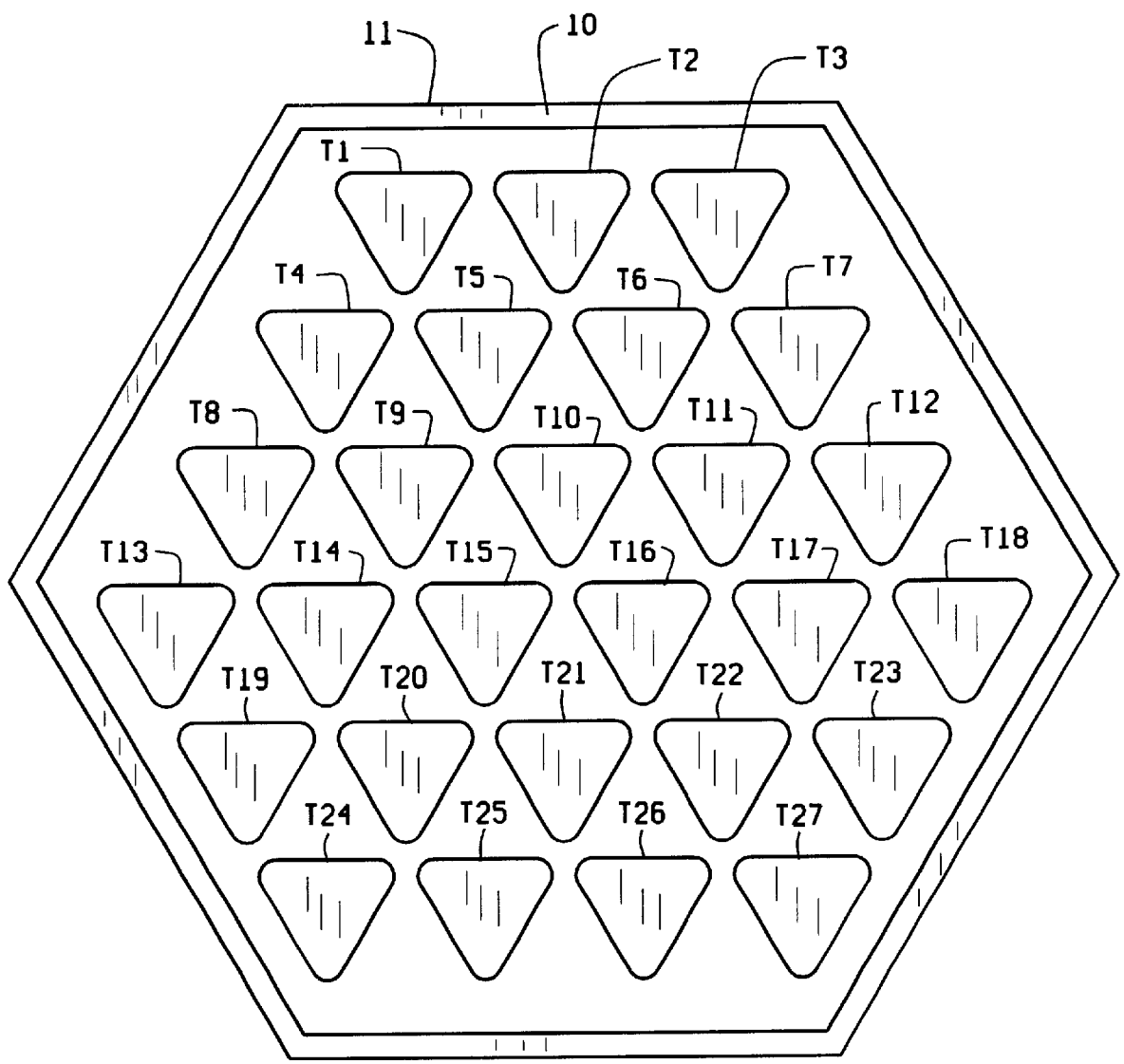
FIG. 1 is a front elevation of an optical target to be attached to a vehicle wheel, said target to be viewed by a video camera, for determining wheel alignment parameters.

FIG. 1 is a face-on view of an optical target 10 to be attached to a vehicle wheel. The target 10 consists of a hexagonally shaped ring 11 which surrounds 27 triangularly shaped elements T1–T27 respectively. Each triangularly shaped element T1–T27 consists of a triangle with rounded comers, arranged such that, if the comers were not rounded, vertex points of adjacent triangularly shaped elements would coincide.

Figure 2:
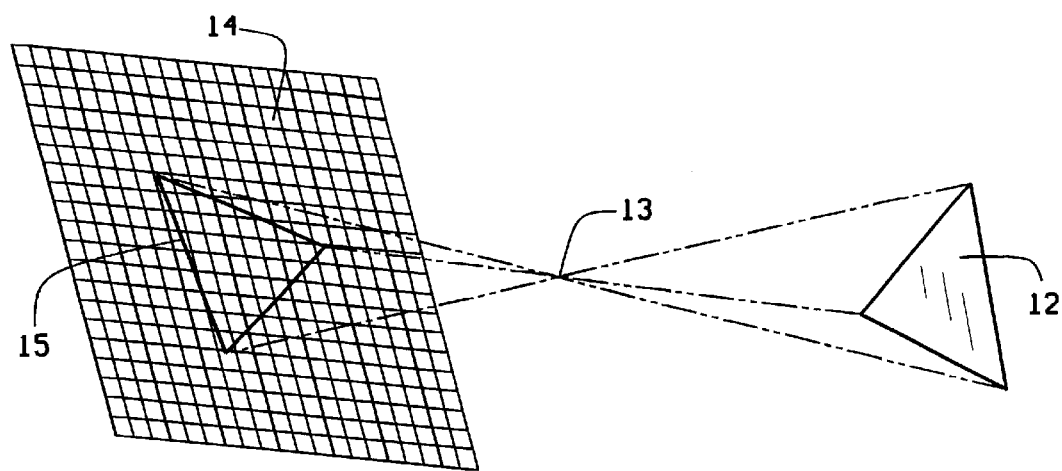
FIG. 2 is an illustration of how a triangle projects through the principal point of a lens onto the pixel array of a video camera, thereby forming an image of the triangle.

FIG. 2 is an illustration of how a triangle 12 projects through the principal point 13 of a lens (not shown) onto the pixel array 14 of a video camera (not shown), thereby forming a projected image 15 of the triangle 12. This is an ordinary perspective projection, as is well understood in the art, showing how the shape and size of the projected image 15 formed is determined by the shape and size of the triangle 12, the focal length, and the orientation and location of the triangle 12 relative to the principal axis and principal point of the camera.

Figure 3:
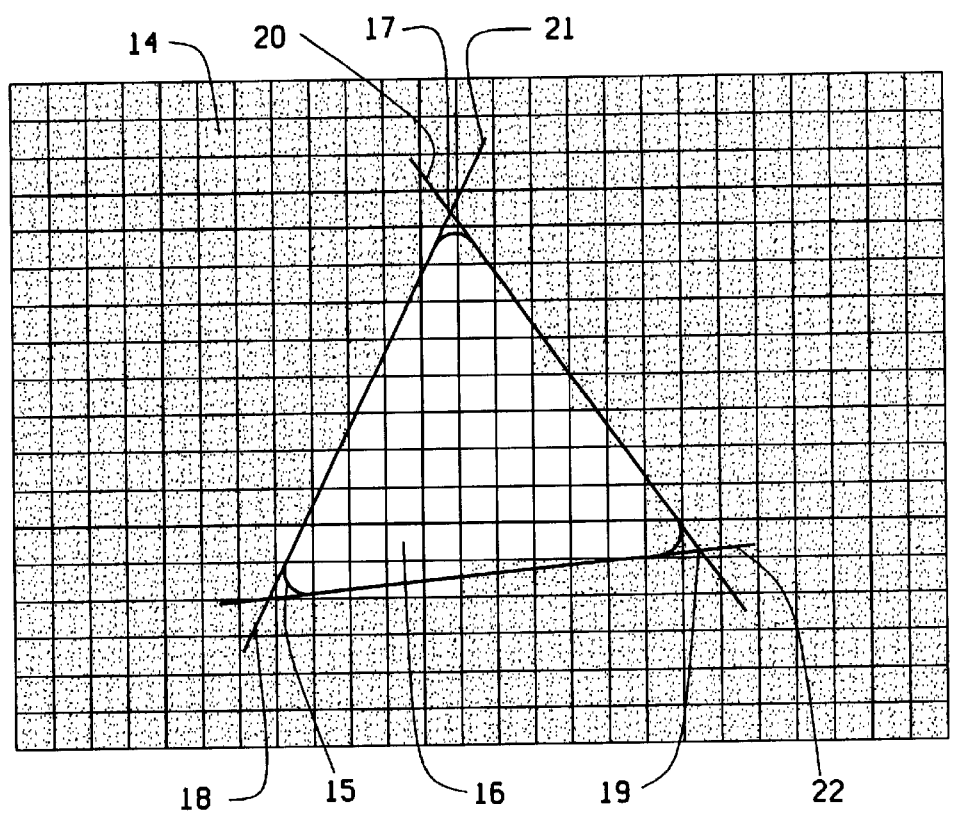
FIG. 3 is an illustration of how the projection of a triangularly shaped element of the target of FIG. 1 illuminates the pixel array of FIG. 2, and how lines along the sides of the projected image of the element intersect at the vertex points of the triangle.

FIG. 3 is an illustration of how the projected image 15 of the triangle 12 illuminates the pixel array 14. Pixels which are light colored in FIG. 3 are more than half illuminated by the projected image 15 while pixels which are dark colored are less than half illuminated by the projected image 15. The object 16 which appears in the pixel array clearly corresponds to the projected image 15 which produced it.

In FIG. 3, line 20 is a line which coincides with the upper right side of the projected image 15, line 21 is a line which coincides with the upper left side of the projected image 15, and line 22 is a line which coincides with the bottom side of the projected image 15. Point 17 is the intersections of lines 20 and 21, point 18 is the intersection of lines 21 and 22, and point 19 is the intersection of lines 20 and 22.

Of central interest to the invention is the determination of the coordinates, in units of "pixels", of points 17, 18, and 19. This determination must be made with high resolution and accuracy. Two examples suffice to show the need for high resolution and accuracy. Suppose a point on a target is located at a distance of 150 inches from the principal point of a camera. Suppose the camera has a focal length of 1.378 inches (35 mm) and a pixel size of 0.0005 inches (12.7 microns). These are representative dimensions for such a system. If the target moves away from the camera a distance of 0.01 inches, the projection of the point onto the pixel array of the camera moves approximately 0.004 pixels. Suppose the face of the target is at an angle about a vertical axis of 45 degrees to the principal axis of the camera and the point is 5 inches from the center of the target. If the target rotates about a vertical axis by 0.01 degrees, the projection of the point onto the pixel array of the camera moves approximately 0.011 pixels.

If the system must determine the location and orientation of the target in three dimensional space to a resolution of 0.01 inches and 0.01 degrees, it is apparent that the system must be capable of resolving measurements of points of interest in the projected image of the target to a resolution of better than 0.01 pixels. FIG. 3 quite graphically illustrates how difficult this is.

Conventional image analysis systems, as described in U.S. Pat. No. 5,535,522, determine the centroid of an object as the centroid of a set of adjacent pixels which all lie above some threshold. The accuracy of such a measured centroid, as compared to the centroid of the projected image, is seldom better than approximately ¼ pixel. In general, the accuracy of such a computation is inversely proportional to the square root of the width or height of the object in pixels. For example, to produce a statistical accuracy of 0.01 pixels requires an object width or height of approximately 900 pixels. Determinations of the dimensions of the major and minor axes of an ellipse, which is the perspective projection of a circular target element, produce similar low levels of accuracy.

These conventional determinations can be somewhat improved by using centroid computation methods which take into account the actual gray scale value of each pixel, but this involves several tradeoffs. To provide an image with a sufficient number of pixels, the object still must occupy a very large fraction of the field of view, which greatly limits the range of motion of the target during normal use and which greatly limits the number of circles which may be used in the target, or the pixel array of the camera must have a very large number of elements, which is quite expensive.

The present invention overcomes these limitations by the manner with which it measures the points of interest in the projected images of the target elements. In general, lines are fitted to edges of the projected images of the target elements in those places where those edges were known to be produced by straight line segments in the target elements. The idea is to determine or estimate where the lines of the target elements must have been projected to have produced the detected images.

Figure 4:
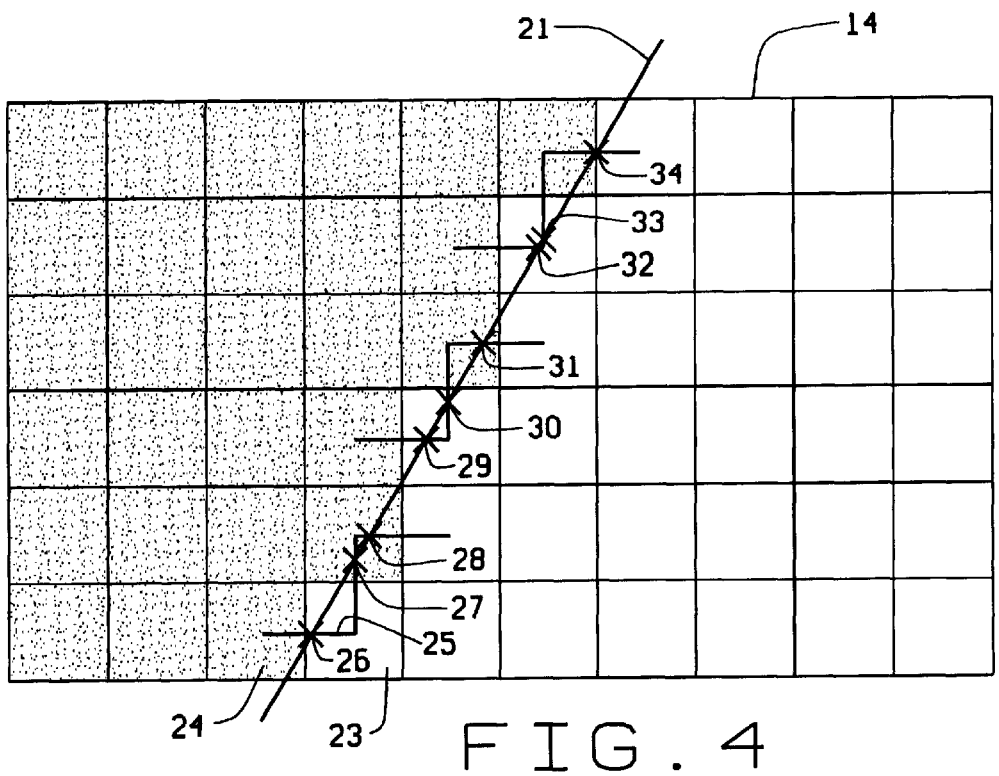
FIG. 4 is an illustration of how points are interpolated along the edge of the image of the triangularly shaped element in FIG. 3, and how a line is fitted to the interpolated points.

This is illustrated in FIG. 4, which shows a portion of the pixel array 14. The lighter colored pixels in FIG. 4 on the right side of the array are each more than one half illuminated by the projected image 15 while the darker colored pixels on the left side of the image are each less than one half illuminated. The set of light pixels constitutes an object 16 in the image which is detected by scanning the image in a conventional manner. The line 21 lies along the upper left edge of the projected image 15. The system determines where this line is by interpolating points along the edge of the object 16. Each interpolated point lies between a pixel on the edge of the object 16 and an adjacent point in the background of the image. To illustrate how this is done, consider pixel 23, which is a pixel on the edge of the object 16, and pixel 24, which is an adjacent pixel in the background of the image. Line segment 25 is a construction line which connects the center of pixel 23 with the center of pixel 24. The interpolated point 26 lies along line segment 25. Assume:

$S_{23}$=the signal level of pixel 23

$S_{24}$=the signal level of pixel 24

$S_L$=the average level of a signal which is 0% illuminated $S_H$=the average level of a signal which is 100% illuminated d=the distance between the centers of adjacent pixels The y coordinate (i.e. up/down) of the interpolated point 26 is the same as for pixel 23 and pixel 24. The x coordinate (i.e. left/right) of the interpolated point 26 is computed by:

$$x = x_{23} - d\left[\frac{S_{23} - S_L}{S_H - S_L} + \frac{S_{24} - S_L}{S_H - S_L} - \frac{1}{2}\right]$$

This is a very simple interpolation scheme. More complex schemes can be used, but such schemes have several drawbacks. Firstly, they generally involve knowledge of the slope of the line. Since the line has not yet been determined, this presents a difficulty. An iterative technique can be used in which simple interpolation provides a good estimate of the line, the slope of which can be used to re-interpolate the points. Secondly, the image typically has a small amount of noise and is produced by a lens which is not perfectly focused. The resulting slight image smear negates any advantage such schemes provide. It has been found that simple interpolation produces quite satisfactory results, even in the presence of noise or improper focus.

The interpolated points 27–34 are determined similarly. In a conventional manner, the line 21 is determined or estimated by fitting a line through these interpolated points 26–34 using a least-squared-error method. Lines 20, 21, and 22 are fitted to the sides of the object 16 which corresponds to the projected image 15, thus allowing the locations of the vertex points 17, 18, and 19 of the projected image 15 to be determined.

Figure 5:
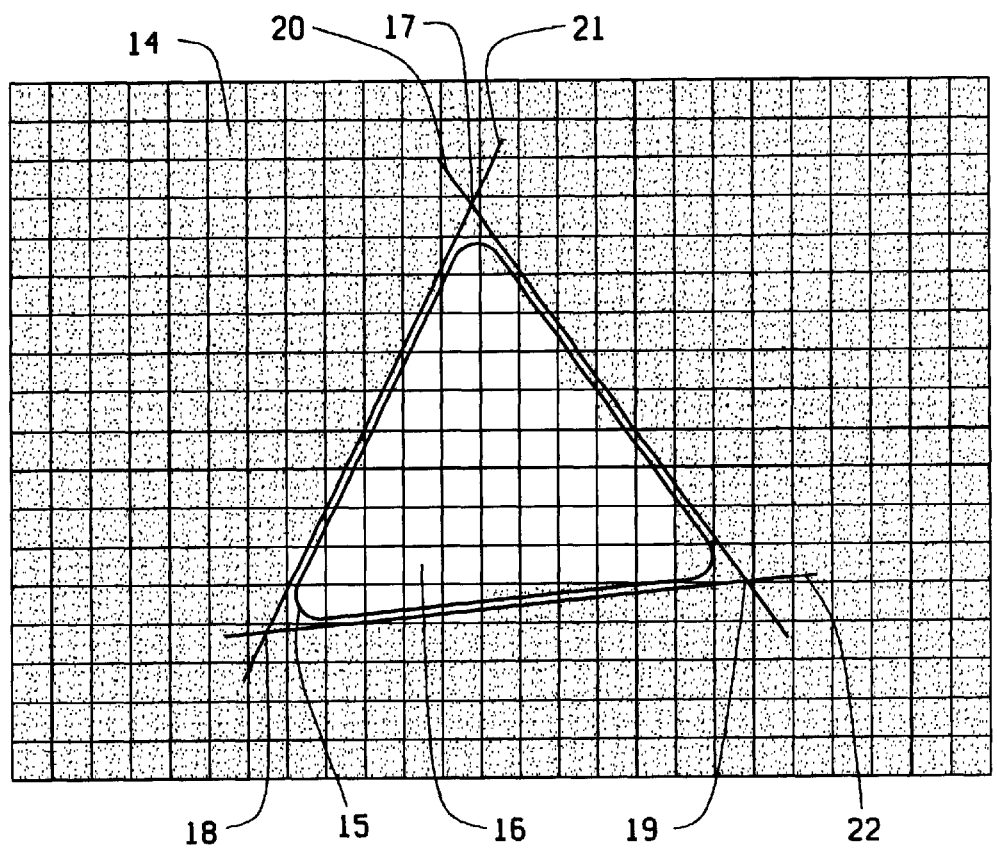
FIG. 5 is an illustration of how incorrect interpolation of the points of FIG. 4 result in lines being incorrectly fitted to the edges of the triangularly shaped element, thereby providing incorrect determination of the vertex points.

$S_H$ is determined by averaging the signal level of the pixels near the centroid of the object 16 while $S_L$ is determined by averaging the signal level of the pixels in the background near the object 16. If $S_L$ and $S_H$ are not correct, due to noise, for example, or perhaps due to a gradient of illumination across the target, the situation illustrated in FIG. 5 may result. In FIG. 5, lines 20, 21, and 22 are displaced outward from the object 16 by a small amount. The effect of this offset is to shift the determination of points 17, 18, and 19 away from object 16 and thus outward from their actual positions. Errors in $S_L$ and $S_H$ might just as easily displace the lines 20, 21, and 22 inward toward object 16, which would have the effect of shifting the determination of points 17, 18, and 19 toward object 16 and thus inward from their actual positions. This is a real problem because, if the condition illustrated in FIG. 5 occurs with the target shown in FIG. 5, there is no way to know. Note that a similar problem would occur if an ellipse were to be fitted to the projection of a circular target element. There would be no way to know if the lengths of the axes of the ellipse or if the orientation of the ellipse were correct or not.

Figure 6:
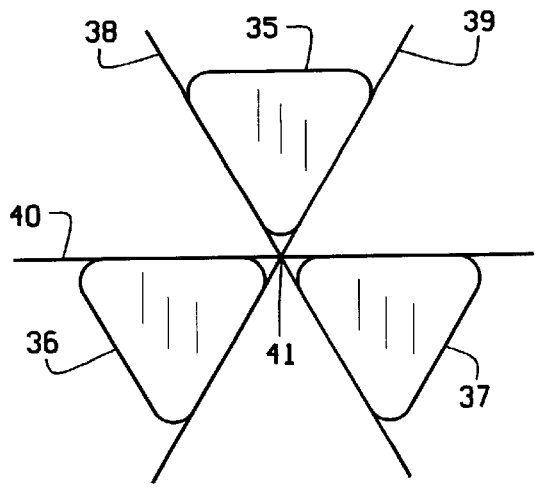
FIG. 6 is an illustration of how lines fitted through the edges of three different triangularly shaped elements intersect in a single point.

FIG. 6 is an illustration of how the present invention overcomes this problem. In FIG. 6, three triangularly shaped target elements 35, 36, and 37 share a common vertex point 41. Vertex point 41 is found at the intersection of three lines—line 38, which is determined from points interpolated along the left sides of triangularly shaped target elements 35 and 37, line 39, which is determined or estimated from points interpolated along the right sides of triangularly shaped target elements 35 and 36, and line 40, which is determined or estimated from points interpolated along the top sides of triangularly shaped target elements 36 and 37. This is the ideal situation, when $S_L$ and $S_H$ are perfectly determined.

Figure 7:
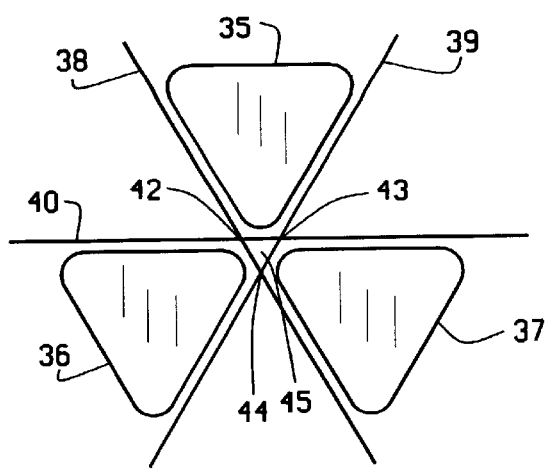
FIG. 7 is an illustration of how lines incorrectly fitted through the edges of three different triangularly shaped elements intersect in a small triangle, thereby showing how the accuracy of fitting lines to the edges of the triangularly shaped elements can be determined and improved.

FIG. 7 shows what happens when $S_L$ and $S_H$ are not quite perfectly determined. In FIG. 7, lines 38, 39, and 40 are shifted outward from the triangularly shaped elements 35, 36, and 37, thus intersecting in three points 42, 43, and 44, which form a small triangle 45. The size of triangle 45 is thus a figure of merit for the quality of the interpolation of points which define lines 38, 39, and 40. This figure of merit can be used to refine the determination of $S_L$ and $S_H$. The procedure is as follows: Raise $S_H$ and $S_L$ slightly, then redetermine the lines and the triangle 45. If the triangle 45 decreased in size, the original $S_H$ and $S_L$ were too low. If the triangle 45 increased in size, the original $S_H$ and $S_L$ were too high. Based on this test, iteration can be used to refine the values of $S_H$ and $S_L$ and redetermine the lines and the triangle 45 until the size of the triangle 45 is as small as possible. Once the triangle 45 is as small as it can be made, point 41 can be determined as the centroid of triangle 45, or the more elaborate method of singular value decomposition can be used to find the optimum point representing the imperfect intersection of three lines. In any case, the ability to determine the location of vertex point 45 is greatly improved and the accuracy and resolution of the system is much enhanced.

Figure 8:
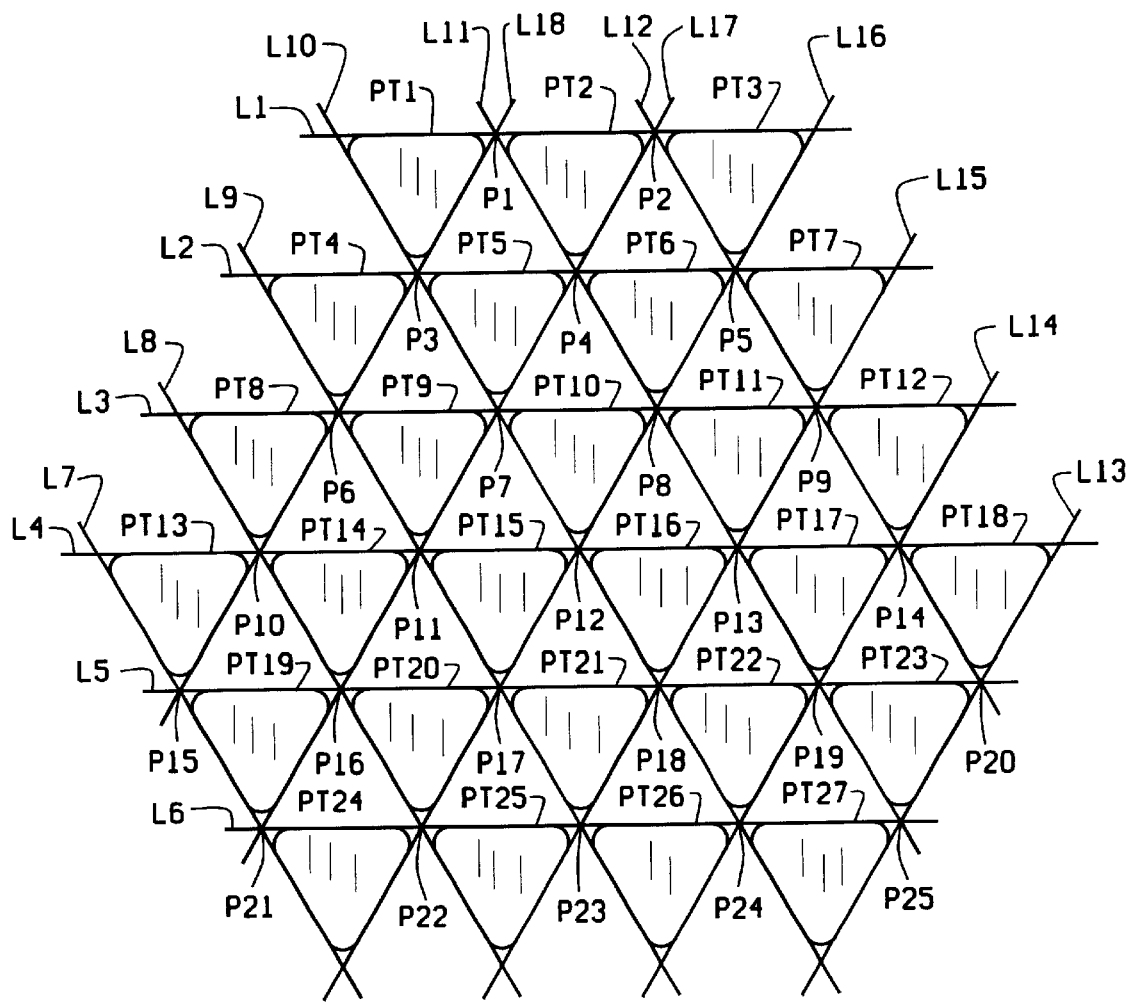
FIG. 8 is an illustration of how lines fitted through the edges of all the triangularly shaped elements of the target of FIG. 1 intersect in an array of points, thereby constituting the points to be measured in the image of the target.

FIG. 8 shows how this is used with target 10. Lines L1–L18 are determined along the sides of the projections PT1–PT27 of triangularly shaped elements T1–T27. These lines intersect in points P1–P25. The actual dimensions and relative locations of the triangularly shaped target elements T1–T25 of target 10 are known. The actual position and orientation of target 10, relative to the central axis of the camera system, are computed from the coordinates of points P1–P25, using the method of inverse perspective projection. This method is explained in "An Efficient and Accurate Camera Calibration Technique for 3D Machine Vision", by Roger Y. Tsai, which is found in "Proceedings of IEEE Conference on Computer Vision and Pattern Recognition", Miami Beach, Fla., 1986, pages 364–374.

The present invention has a further advantage which improves the determination of the points of interest in the image. In FIG. 8, line L16 is determined by fitting a line through the points interpolated on the corresponding sides of projections PT3, PT6, PT10, PT15, PT20, and PT24 of triangularly shaped elements T3, T6, T10, T15, T20, and T24. The quality of this line is high due to the number of interpolated points which define it and the length in the pixel array over which these points are found. In a manner which is readily apparent on examining FIG. 8, the measured lines are determined from interpolated points which are found on projections of three, four, five, or six triangularly shaped target elements.

Note that the key to the target elements is that they have straight edges. Instead of triangular shapes, squares, rectangles, pentagons, stars, or any polygonal shape could be used. Indeed, a single optical element with a great many properly oriented straight edges could be used. A triangularly shaped element has distinct advantages, primarily in that its ratio of perimeter length to area is the highest of all polygonal shapes, thereby providing the greatest number of edges to measure in the smallest possible area of the image.

Using target elements with straight edges is a considerable advancement over the use of target elements which are circular in shape. In general, known points in the target project to corresponding points in the image. The locations of these projected points must be determined by examining the image, such that the method of inverse perspective projection can be used to determine the location and orientation of the target from those measurements. The problem with circles is that, although a circle in the target projects to an ellipse in the image, the center of the circle does not project to the centroid of the ellipse. The difference between the two is quite significant. In fact, there is no point in or on the circle which projects to a directly measurable point in the image. The location of the projection of the center of the circle can be found by measuring the length and orientations of the major and minor axes of the ellipse, along with other parameters, but the mathematics involved is quite daunting and the results do not provide sufficient accuracy for use with wheel alignment equipment. As has been shown above, the use of target elements with straight edges allows the locations of the projections of known points in the target to be directly made with high accuracy.

To measure the edges of the objects in the image and thus the projected vertex points of the target 10, the objects in the image must first be detected and classified. Scanning an image to determine and characterize the objects within it is conventional, as explained in any number of textbooks on the subject such as "Computer and Robot Vision" by Haralick and Shapiro. As the image is scanned, objects are detected and their characteristics are determined. These characteristics include, but are not limited to, area (the number of pixels in the object), bounding rectangle (the smallest rectangle which contains all the pixels of the object), centroid (as x and y coordinates), density (the ratio of the area of the object to the area of the bounding rectangle), second moments about the axes, and so on. The, problem is that many objects appear in the image which are not projections of elements of the target, as the target does not occupy the entire field of view. These detected objects include reflections from numerous physical objects of many shapes and sizes, and so they may easily have measured characteristics which are similar to the characteristics of the objects which are projections of elements of the target. The difficulty is to separate the wheat from the chaff, as it were.

Figure 9:
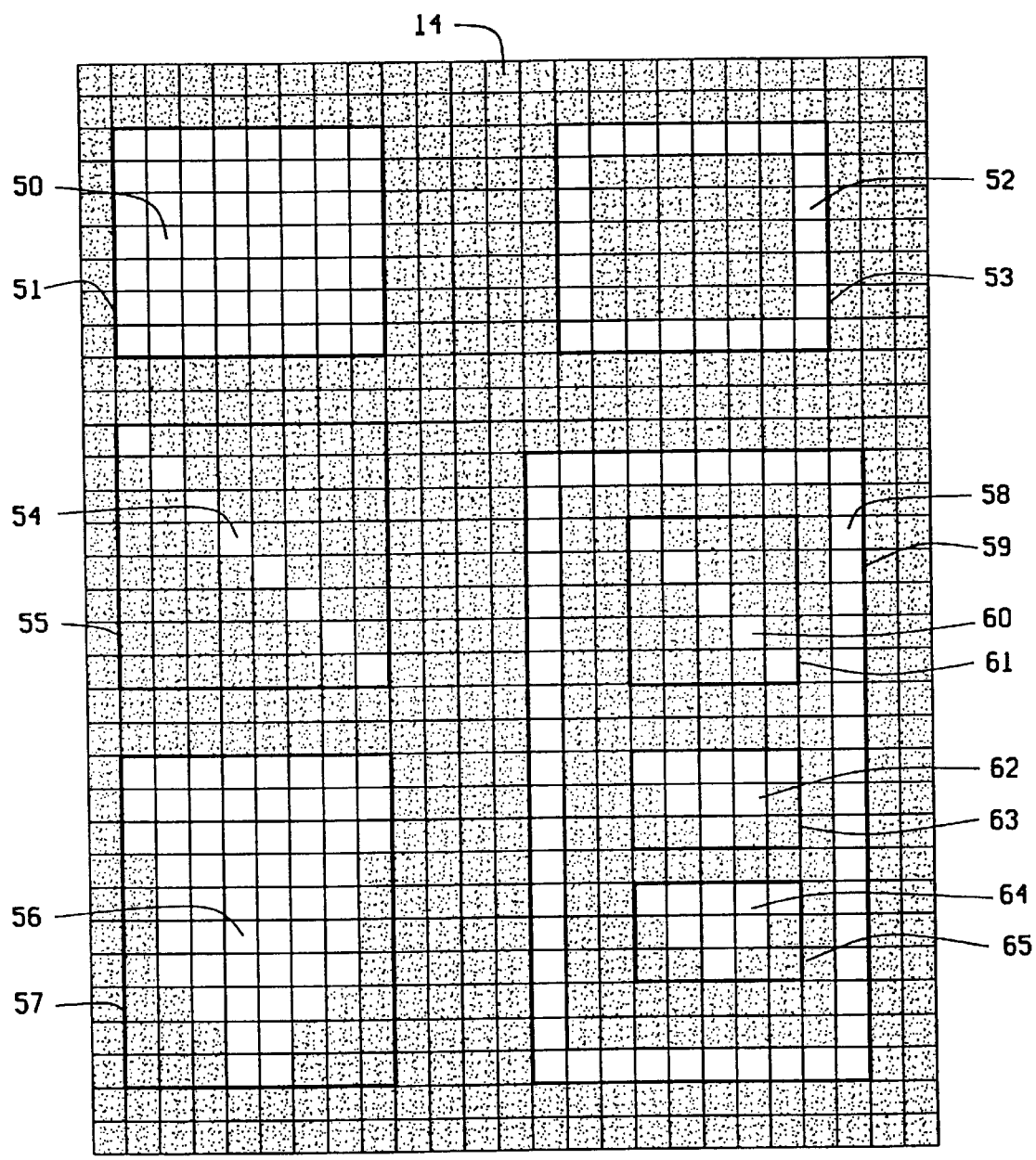
FIG. 9 is an illustration of how the image of the target of FIG. 1 can be easily recognized through the detection of hollow objects in the image.

FIG. 9 illustrates the concept of "hollowness", in which a detected object can be said to contain other detected objects. FIG. 9 shows a pixel array 14 which has been scanned and in which are found numerous objects. The objects can be found in a conventional manner wherein the threshold value between pixels in objects and pixels in the background is set as the value midway between the high and low peaks of a histogram of the pixel values. Object 50 is a solid rectangle which is bounded by bounding rectangle 51. Object 50 has a density of 1.00, and so is called a solid object. Object 52 is a hollow rectangle which is bounded by bounding rectangle 53. Object 52 has a density of 0.46, and is called a hollow object because it has low density. Object 54 is a diagonal line which is bounded by bounding rectangle 55. Object 54 has a density of 0.125, and thus is also called a hollow object. Object 56 is a triangularly shaped object which is bounded by bounding rectangle 57. Object 56 has a density of 0.700, and so is not termed a hollow object. FIG. 9 also shows object 58, which is bounded by bounding rectangle 59. Object 58 is a hollow object, having a density of 0.28. Object 58 contains objects 60, 62, and 64, which are bounded by bounding rectangles 61, 63, and 65, respectively. Object 58 is said to contain objects 60, 62, and 64 because bounding rectangles 61, 63, and 65 are entirely within bounding rectangle 59.

FIG. 9 shows how the system is able to easily determine which objects in the image constitute the projections of the triangularly shaped targets elements T1–T27 of the target 10. Note in FIG. 1 that target 10 also includes a hexagonally shaped ring 11 which surrounds the triangularly shaped targets elements T1–T27. The projection in the pixel array 14 of ring 11 is detected as a large object which is very hollow, typically having a density measurement less than 0.05. Most importantly, the bounding rectangle of this object contains the twenty seven objects which constitute the projections of the triangularly shaped targets elements T1–T27. The steps of finding the correct objects in the image thus are: 1) Scan the image to find and measure the objects. 2) Determine the smallest hollow object which contains at least twenty seven other objects. Make a list of these contained objects. 3) If more than twenty seven objects are found, discard, one at a time, those objects which deviate the most from the means of the measured characteristics of the remaining objects in the list, thereby reducing the list to the twenty seven most homogeneous objects. 4) Interpolate the points on the edges of the objects in the list. 5) Fit the lines to the interpolated points. 6) Find the points of intersection of the fitted lines. 7) Use the method of inverse perspective projection to determine the location and orientation of the target from the known characteristics of the target and the locations of the intersections.

Note that the field of view of the camera may contain many such targets, for example one on a front wheel and one on a rear wheel, which can be found one at a time. The system simply continues to examine hollow objects until all targets are found.

The target 10 may contain an element which "bounds" the other elements in other ways. For example, the ring 11 need not be a complete ring—it may encircle the other target elements on only two or three sides. Object 54 shows that a simple diagonal line may be used, as it may be interpreted as a hollow object with a large bounding rectangle. A fully enclosing ring is preferred, which may be hexagonal, polygonal, circular, elliptical, or any other shape, as it is perceived as having a bounding rectangle which encloses all the other elements of the target 10 under all viewing conditions.

The inverse perspective transform requires a minimum of seven measured points while the twenty seven triangularly shaped target elements T1–T27 of target 10 provide twenty five such points P1–P25. This is not overkill—the more points that are used, the greater the ability of the transform to estimate the position and orientation of the target, other things being equal. Targets which are attached to the vehicle wheel, such as target 10, are viewed by the camera system over a wide range of orientation angles, and so the measurement system benefits greatly from the large number of points used.

As described in U.S. patent application Ser. No. 08/651, 766 and shown in FIG. 4 therein, however, it is greatly advantageous to mount additional targets to the runways of the vehicle lift rack, so as to allow measurement of the location of the surface upon which the wheels roll. The alignment of the vehicle wheels is thus computed relative to this surface. Such targets do not experience the range of orientations relative to the cameras as do the targets mounted to the vehicle wheels, and so can be made with fewer elements. Measuring the projections of the vertex points of triangularly shaped target elements also allows the target to be relatively small and thus more easily mounted to the lift rack.

Figure 10:
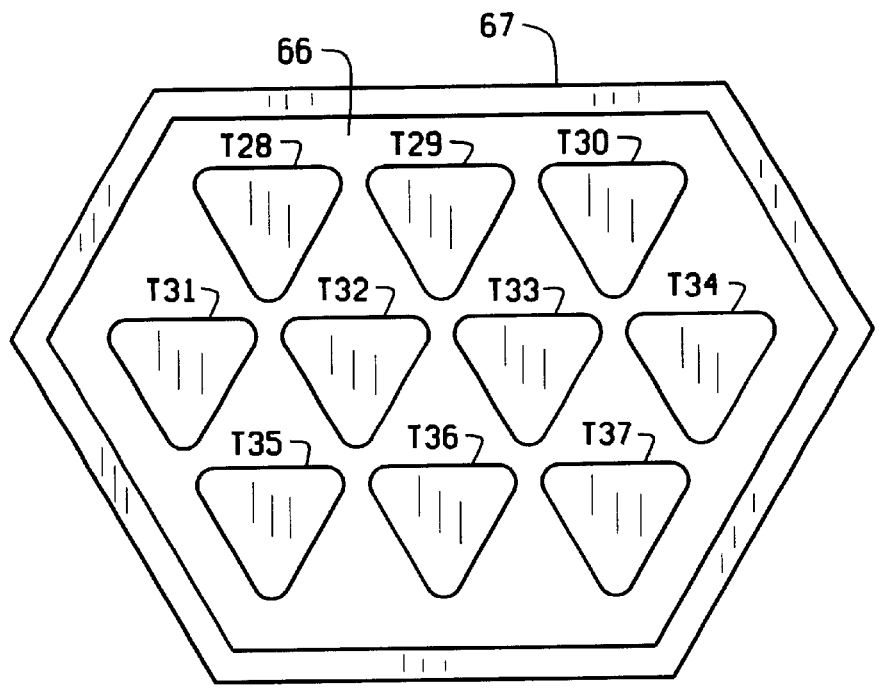
FIG. 10 is a face-on view of an optical target to be attached to a lift rack or to a wheel chock, said target to be viewed by a video camera. The target is comprised of an array of triangularly shaped elements, the array being surrounded by a hexagonally shaped ring.
Figure 11:
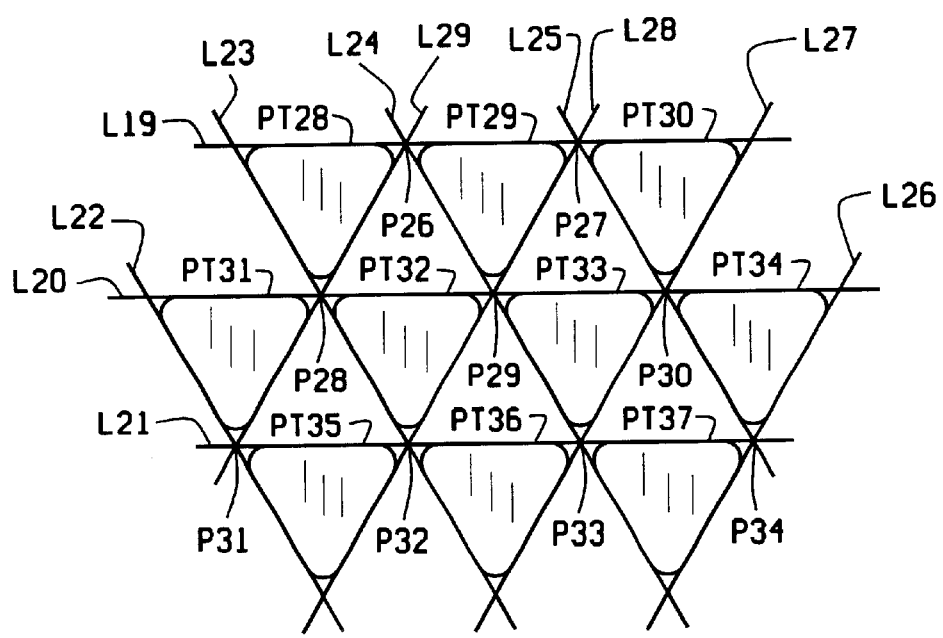
FIG. 11 is an illustration of how lines fitted through the edges of all the triangularly shaped elements of the target of FIG. 10 intersect in an array of points, thereby constituting the points to be measured in the image of the target.

FIG. 10 illustrates a target 66 which is mounted to the runway of the lift rack. This target is comprised of an array of triangularly shaped elements T28–T37, surrounded by a hexagonally shaped ring 67. As shown in FIG. 11, this produces projections PT28–PT37 in pixel array 14, allowing lines L19–L29 to be measured and nine projection points P26–P34 to be determined.

Figure 12:
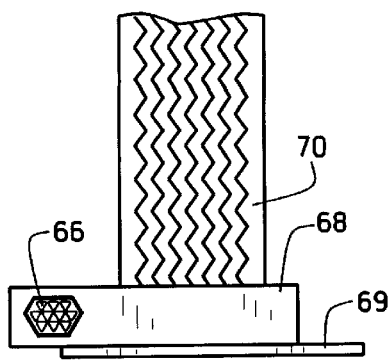
FIG. 12 is a front elevation view showing how the target of FIG. 10 is attached to a wheel chock.
Figure 13:
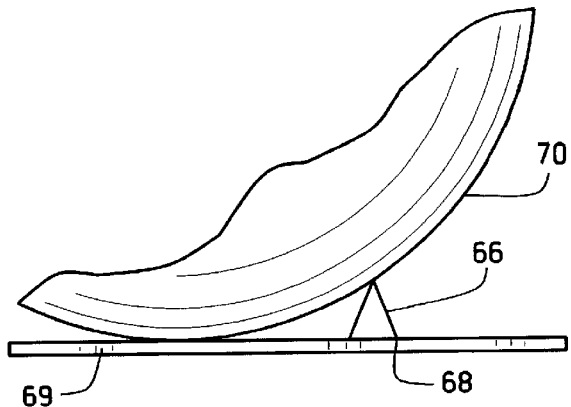
FIG. 13 is a side elevation view showing how the target of FIG. 10 is attached to a wheel chock.

FIG. 12 is an illustration of how this target 66 is mounted to the forward face of a conventional wheel chock 68, which is placed on runway 69 in front of wheel 70. FIG. 13 shows this same situation from the side. FIG. 14 shows how four such targets 66 are located relative to the four wheels 71–74 of the vehicle. Wheel chock 77 with a mounted target 66 is located forward of the left front tire 71, wheel chock 78 with a mounted target 66 is located forward of the right front tire 72, wheel chock 79 with a mounted target 66 is located forward of the left rear tire 73, and wheel chock 80 with a mounted target 66 is located forward of the right rear tire 74.

There are several advantages in this arrangement. The target 66 is located a known distance from the surface of runway 69, thus enabling it to be used to determine the plane which describes the rolling surface of the wheels. The particular manner of their use is not part of the present invention and is in any event explained in U.S. patent application Ser. No. 08/651,766. The front wheel chocks 77 and 78, which are mounted near the front wheels 71 and 72, could be more or less permanently mounted at the front of the lift racks, thereby preventing them from interfering with the operation of the turnplates 81 and 82 on which the front wheels 71 and 72 rest. They could also be mounted to the lift rack by fixtures which are spring loaded, much as side view mirrors are, such that they do not present a safety hazard to a technician who walks next to the lift rack. The rear wheel chocks 79 and 80, which are placed on the slip plates 83 and 84, do not interfere with the adjustments of the alignment of the vehicle, nor are they in the way of the technician who performs those adjustments. By being just outboard the wheels 73 and 74, the rear wheel chocks 79 and 80 are located just under the targets which mount to the rear wheels (these targets are not shown, since they are not particularly relevant to this part of the invention), and thus are well in the field of view of video cameras units 75 and 76. It should be understood that one or both of units 75 and 76 may include a computer for processing the images received thereby in the manner discussed above. Or, the units may be connected to a separate computer console in which that processing occurs. The particular place where the computing power resides is not a part of the present invention, and in any event the location of computing devices in consoles or distributed throughout various pieces of alignment equipment is known.

In view of the above it will be seen that the various objects and features of the invention are achieved, and other advantageous results obtained. It should be understood that the description contained herein is illustrative only and is not to be taken in a limiting sense.

What is claimed is:

1. A method of determining the alignment of a wheel of a vehicle, said method composing the steps of:
    mounting a known optical target to said wheel on said vehicle, said known optical target having a plurality of optical elements which are substantially surrounded by a substantially hollow optical element;
    obtaining at least one video image of said optical target;
    identifying in said video image the projections of said plurality of said optical elements by fist identifying projection of said hollow optical element;
    determining construction lines from the edges of said projections of said optical elements in said video image; and
    determining from said construction lines the alignment of said wheel.

2. The method of claim 1 wherein said substantially hollow optical element is spaced from the plurality of optical elements.

3. Apparatus for determining the alignment of a wheel of a vehicle, said apparatus comprising:
    a known optical target mounted to said wheel on said vehicle, said known optical target having a plurality of optical elements which are substantially surrounded by a substantially hollow optical element;
    at least one video camera for obtaining at least one video image of said optical target containing projections of the optical elements of the target; and
    at least one processor for identifying in said video image the projections of said plurality of optical elements, said processor identifying the projection of said hollow optical element, determining intersection points of construction lines along straight edges of said projections of said optical elements in said video image, and determining from said intersection points the alignment of the wheel.

4. The apparatus of claim 3 wherein said substantially hollow optical element is spaced from the plurality of optical elements.

5. A method of determining the alignment of a wheel of a vehicle, said method comprising the steps of:
    mounting an optical target to said wheel on said vehicle, said optical target having a plurality of optical elements which are substantially surrounded by an optical border circumscribing said plurality elements;
    obtaining at least one video image of said octal target;
    identifying said target in said video image by identifying said circumscribing optical border substantially surrounding said plurality of optical elements; and
    determining the alignment of said wheel from said video image of the plurality of optical elements.

6. The method of claims 5 wherein said optical border is spaced from the plurality of optical elements.

7. An apparatus for determining the alignment of a wheel of a vehicle, said apparatus comprising:
    an optical target mounted to said wheel on said vehicle, said optical target having a plurality of optical elements which are substantially surrounded by an optical border circumscribing said plurality of optical elements;
    at least one video camera for obtaining at least one video image of said circumscribing optical border and said optical elements within it; and
    at least one processor for identifying the target in said video image by identifying the circumscribing optical border, for determining alignment information from said optical elements in said video image, and for determining from said alignment information the alignment of said wheel.

8. The apparatus of claim 7 wherein said optical border is spaced from the plurality of optical elements.

* * * * *